(12) United States Patent
Hsiung

(10) Patent No.: US 6,202,597 B1
(45) Date of Patent: Mar. 20, 2001

(54) FILTER FOR AQUARIA

(76) Inventor: Yung-Li Hsiung, 7F, Lane 154, Hsin-Wen Street., Kaohsiung City (TW)

( * ) Notice: Subject to any disclaimer, the term of this patent is extended or adjusted under 35 U.S.C. 154(b) by 0 days.

(21) Appl. No.: 09/382,652

(22) Filed: Aug. 25, 1999

(51) Int. Cl.$^7$ .................................................. A01K 63/04
(52) U.S. Cl. ................................... 119/259; 210/169
(58) Field of Search .................... 119/259, 260; 210/169

(56) References Cited

U.S. PATENT DOCUMENTS

| | | | |
|---|---|---|---|
| 2,956,507 | * 10/1960 | Hutchinson | 417/478 |
| 4,622,148 | * 11/1986 | Willinger | 210/615 |
| 4,880,531 | * 11/1989 | Blake et al. | 210/169 |
| 5,246,571 | * 9/1993 | Woltmann | 210/86 |
| 6,051,132 | * 4/2000 | Flores | 210/169 |

* cited by examiner

Primary Examiner—Peter M. Poon
Assistant Examiner—Yvonne R. Abbott
(74) Attorney, Agent, or Firm—Dougherty & Troxell

(57) ABSTRACT

A filter for aquaria has a bag shape, an outermost layer of filter cloth made of long fiber non-fabric, an inner layer of filter net made of polyester, a mouth inlet formed in one end and the other end closed to form a hollow interior lengthwise passage for water to enter therein. Then filthy water of an aquarium may flow through a connect tube connected to the inlet into the hollow interior passage, and gradually seep through the inner layer of filter net and the outer layer of filter cloth in any direction and of a large area through small and tiny air holes of the two layers to receive filtering process to seep out of the outer surface of the filter cloth and fall into the aquarium again. The filter can be judged by users whether or not to be replaced with a new one by the color of the filter cloth.

4 Claims, 3 Drawing Sheets

| MATERIAL | WEIGHT PERCENTAGE | REMARK |
|---|---|---|
| PVA | 47 - 65 % | POLYVINYL ALCOHOL |
| VEGETABLE STARCH | 28 - 47 % | SWEET POTATO POWDER WITH WATER |
| CATALYZER I | 4.5 - 10.0 % | HYDROCHLORIC ACID OF 32% CONCENTRATION |
| CATALYZER II | 3.6 - 10.0 % | FORMALIN OF 37% CONCERTATION |
| ACTIVE CARBON | 0.3 - 180 % | BY NECESSITY |
| FIBER |  | THICKNESS BY NECESSITY |
| FOAMING AGENT | 0.015 - 0.06 % | BY CHOICE |

FILTER FOR AQUARIA

BACKGROUND OF THE INVENTION

This invention relates to a filter for aquaria, particularly to one having strong filtering capacity by means of plural layers of filtering and toxic removing.

A known conventional filter for aquaria shown in FIG. 1, includes a filter plate 2 for filtering comparatively large particles and a second filter net 3 for filtering rather tiny particles out of water, which is then sent back repeatedly into an aquarium A.

However, the known conventional filter for aqauria is not ideal, with fish easily dying, having the following disadvantages.

1. Filtering effect is not good, needing frequent washing of an aquarium and changing of water. It has only one layer of filtering with large holes 22 formed in the filtering plate 2 so as not to let water directly brim out. Therefore filtered water still mixes with miscellaneous dirty matters such as feed remains, waste etc., producing toxic by decomposing by bacteria, resulting in frequent washing and changing of water.

2. In taking it off, miscellaneous matters may easily fall into an aquarium. Some filters includes sand and filter stones, so miscellaneous matters attaching on them may easily fall down into water in changing them, resulting in bad water quality and death of fish.

3. In replacing it, filter nets have to be changed as well. Filtered matters on the second net layer 3 may directly drop into water in an aquarium owning to bad filtering of the filter plate 2, liable to let bacteria or moss propagate in water, spoiling water quality. In addition, the second filter net 3 is hard to judge its quality by observation from outside, sometimes to be delayed in replacing with a new one.

SUMMARY OF THE INVENTION

This invention has been devised to offer a filter for aquaria replaceable with a new one in case of need, having a lower cost.

The feature of the invention is a bag-shaped filter having an outer layer of filter cloth made of long fiber non-fabric and an inner layer filter net, a mouth inlet formed in one end and the other end closed to form an hollow interior passage. Then the mouth inlet is tightly connected to a connect tube through which the water of an aquarium flow into the hollow interior passage to seep out of and be filtered by the inner layer of filter net and the outer layer of filter cloth gradually out of the outer surface of the filter cloth to fall down into the aquarium again. Thus dirty water of the aquarium receives filtering process for a large area, and the filter may easily be replaced when it becomes too filthy.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
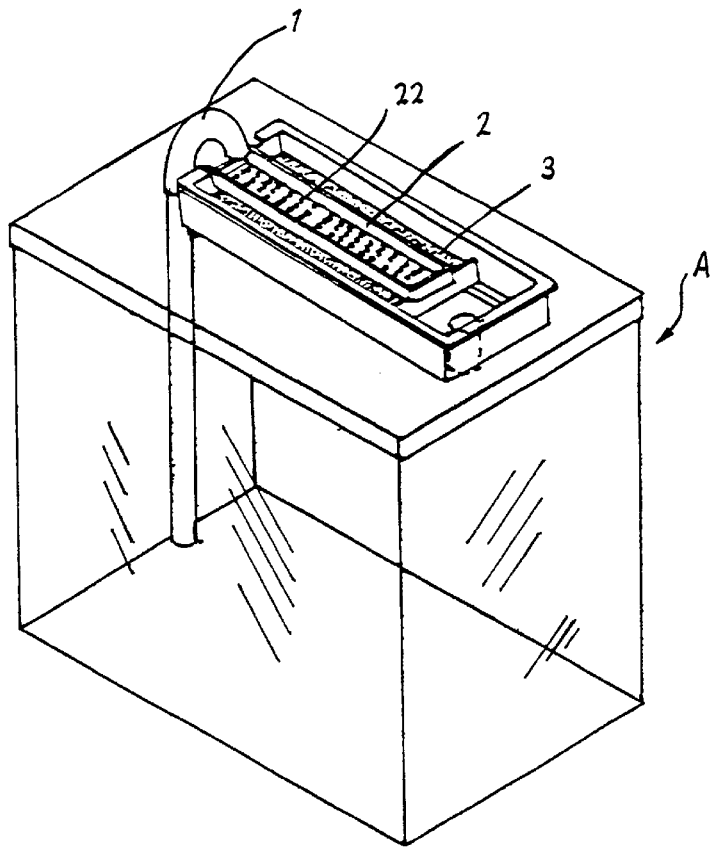
FIG. 1 is a perspective view of a known conventional filter for aquaria.
Figure 2:
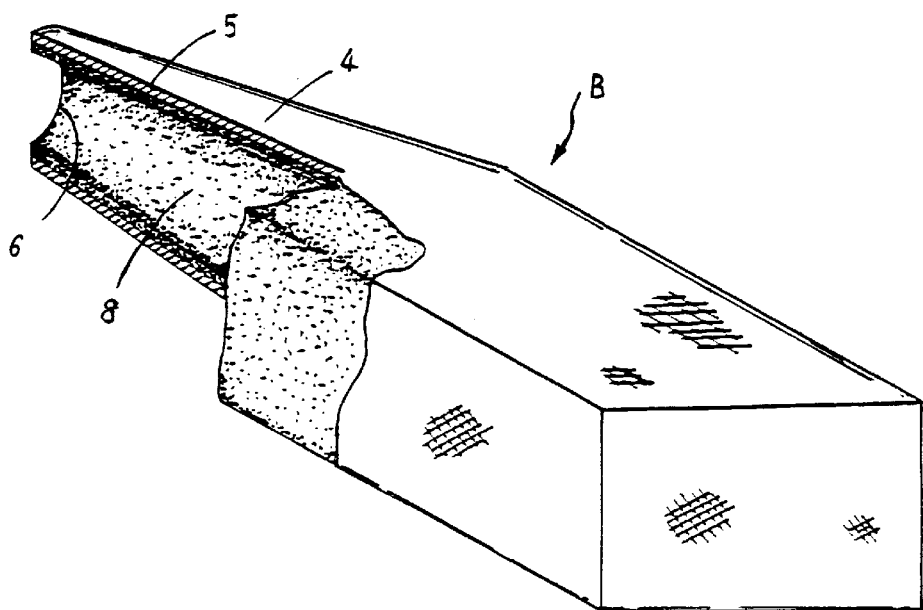
FIG. 2 is a part cross-sectional and perspective view of a filter for aquaria in the present invention.
Figure 3:
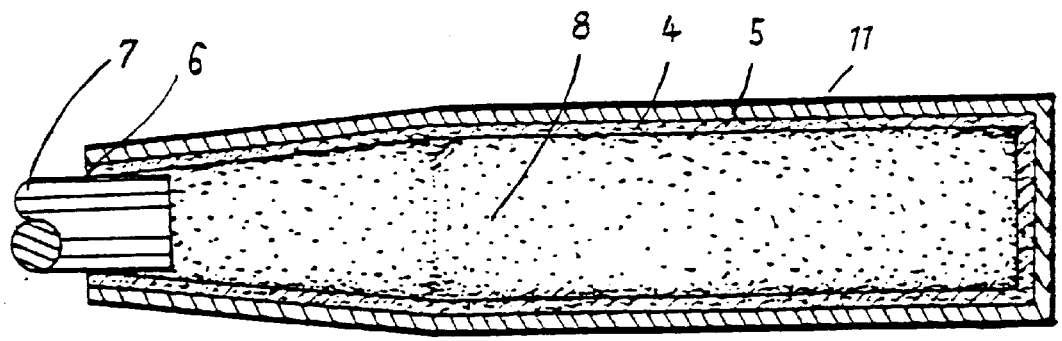
FIG. 3 is a cross-sectional view of the filter for aquaria in the present invention.
Figure 4:
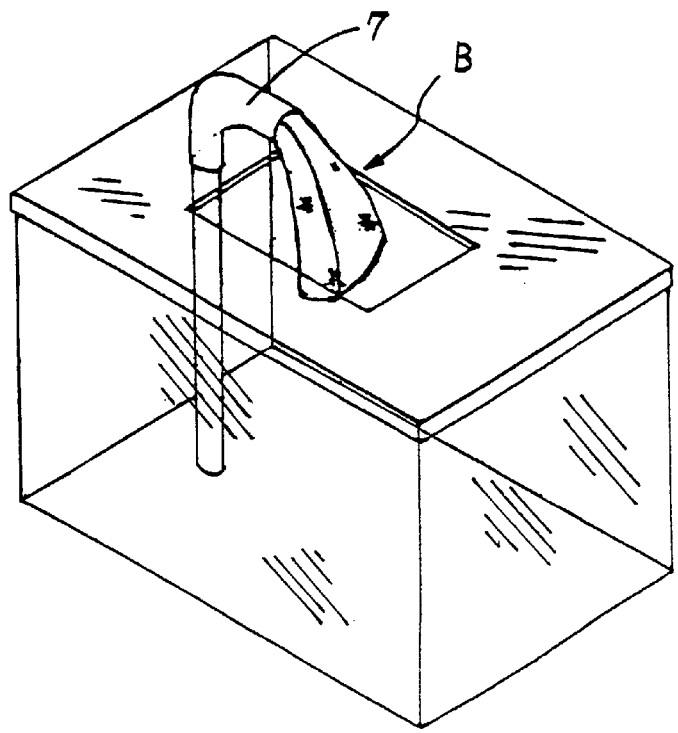
FIG. 4 is a perspective view of the filter for aquaria practically used in an aquarium in the present invention.

A preferred embodiment of a filter for aquaria in the present invention, as shown in FIGS. 2, 3 and 4, includes an outermost layer of filter cloth 4 of a bag shape made of non-fabric material of long fiber with large density and small air holes for filtering tiny or micro particles. Inside the filter cloth 4 is a layer of filter net 5, (shown in Figures only one layer, but maybe two or more layers in case of need). For example, as shown in FIG. 5, a first layer of filter net 9 is provided around on a second layer of filter net 10, having larger density and smaller air holes than the second filter net 10 for different filter function.

The filter net 5 is made of polyester, having having smaller density and larger air holes than the filter cloth 4 for filtering medium and large particles for the primary step of filtering process. A hollow lengthwise passage 8 is formed in the filter B for water to flow therein, and a mouth inlet 6 formed in one end of the hollow passage 8, made of a constrict band of excellent resiliency to tightly fitting around an end of a connect tube 7. Then dirty water of an aquarium flowing through the connect tube 7 passes through the inlet 6 into the passage 8, then seeping through first the filter net 5 for comparatively large particles to be filtered off water, and then through the filter cloth 4 for tiny or micro particles to be filtered off, without using mineral stone or sand for filtering, and thus saving cost. Besides, A user can judge from the outer look of the filter whether the filter is too filthy or not in replacing with a new one, with the filter being easy to be changed, by taking the inlet 6 off the connect tube 7.

Figures 5, 6:
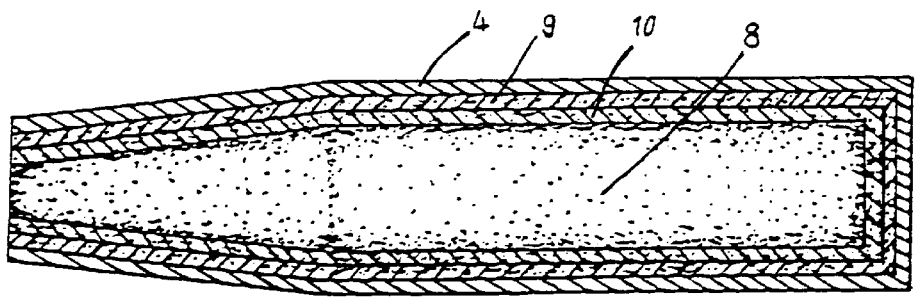
FIG. 5 is a cross-sectional view of the filter with two layers of filter nets in the present invention; and, FIG. 6 is a table of the components of a filter sheet in the present invention.

A filter sheet 11 can be made with components shown in FIG. 6, surrounding the filter B and directly covering on the filter cloth 4. The components includes a first catalyst of weight ratio of 3.6%–10.0%, a second catalyst of weight ratio of 4.5%–10.0%, glutinous starch of weight ratio of 28%–47%, liquid non-particle PVA (polyvinyl alcohol) of weight ratio of 47%–65%, active carbon of weight ratio of 0.3%–180% of the aggregate of the previous components, and fiber of any percentage according to need. Then the filter sheet 11 can reinforce filter function in addition to the filter, permitting filtered water not containing any toxic or bacteria, reducing propagation of bacteria and moss, prolonging service life of the filter net 5.

In addition, the inlet 6 can be made of easily plastic silicon rubber instead of a constrict band, fitting tightly around the connect tube 7, preventing the filter from falling off the connect tube 7 in case of high inner pressure of the filter.

As can be understood from the aforesaid description, the filter in the invention has the following advantages.

1. It is unnecessary to frequently wash or replace with a new one.

Water is filtered from inside to outside, passing through plural layers of filter material for large dimensions, never brimming out before being filtered, with quality of filtered water never being inferior to produce bacteria or toxic or impure water.

2. Miscellaneous matters may not drop down into an aquarium when it is taken off.

It is made into a bag shape, completely closed up to have large dimensions for filtering, very easy to fix or take it off by means of the mouth inlet fitting around tightly or taking it off from the end of a connect tube, without possibility of miscellaneous matters attached on the filter material falling down into the aquarium.

3. The filter nets are not needed to be replaced in replacing the filter.

The filter consists of an outer layer of the filter cloth and an inner layer of the filter net, and color change of the outer surface of the filter or change of water volume seeping out of the filter may hint whether it is too filthy with toxic, bacteria or moss and necessary to be replaced with a new one or not.

4. It can be made to any size or shape.

It can be made to order, rectangular, circular, or an angular, having the same function.

While the preferred embodiment of the invention has been described above, it will be recognized and understood that various modifications may be made therein and the appended claims are intended to cover all such modifications which may fall within the spirit and scope of the invention.

What is claimed is:

1. A filter for aquaria having a bag shape with an inlet mouth and an hollow interior passage, an outermost layer of filter cloth made of long fiber non-fabric with large density and small air holes, an inner layer of filter net just under said outermost layer made of polyester and having smaller density and larger air holes than those of said filter cloth, said inlet formed at one end of said filter and communicating with said hollow interior passage closed with the other end of said filter and made of a constrict band of good resiliency, said inlet fitted tightly around a connect tube for leading water in an aquarium into said hollow interior passage, said water coming from said connect tube flowing through said hollow interior passage to seep through said inner layer of filter net and said outer layer of filter cloth, and receiving filtering process in any direction, and of a large area, and of small and tiny air holes of said two layers of filter net and filter cloth to fall down from the outer surface of said filter into said aquarium again, said filter possible to be discarded and judged by users whether it is too filthy and to be replaced with a new one or not.

2. The filter for aquaria as claimed in claim 1, wherein a filter sheet is preferably provided to cover around said outermost layer of filter cloth, having high absorb function for removing odor and toxic, including a first catalyst of weight ratio of 3.6%–10.0%, a second catalyst of weight ratio of 4.5%–10.0%, glutinous starch of weight ratio of 28%–47%, liquid non-particle PVA (polyvinyl alcohol) of weight ratio of 47%–65%, active carbon of weight ratio 0.3%–180% of the aggregate of the above-mentioned materials, and fiber of any weight ratio needed.

3. The filter for aquaria as claimed in claim 1, wherein said inlet is made of silicon rubber instead of a constrict band.

4. The filter for aquaria as claimed in claim 1, wherein said filter cloth is preferably colored white so that color change of said filter cloth may hint the degree of filthiness of said filter cloth for replacing it or not.

* * * * *